United States Patent Office 3,025,549
Patented Mar. 20, 1962

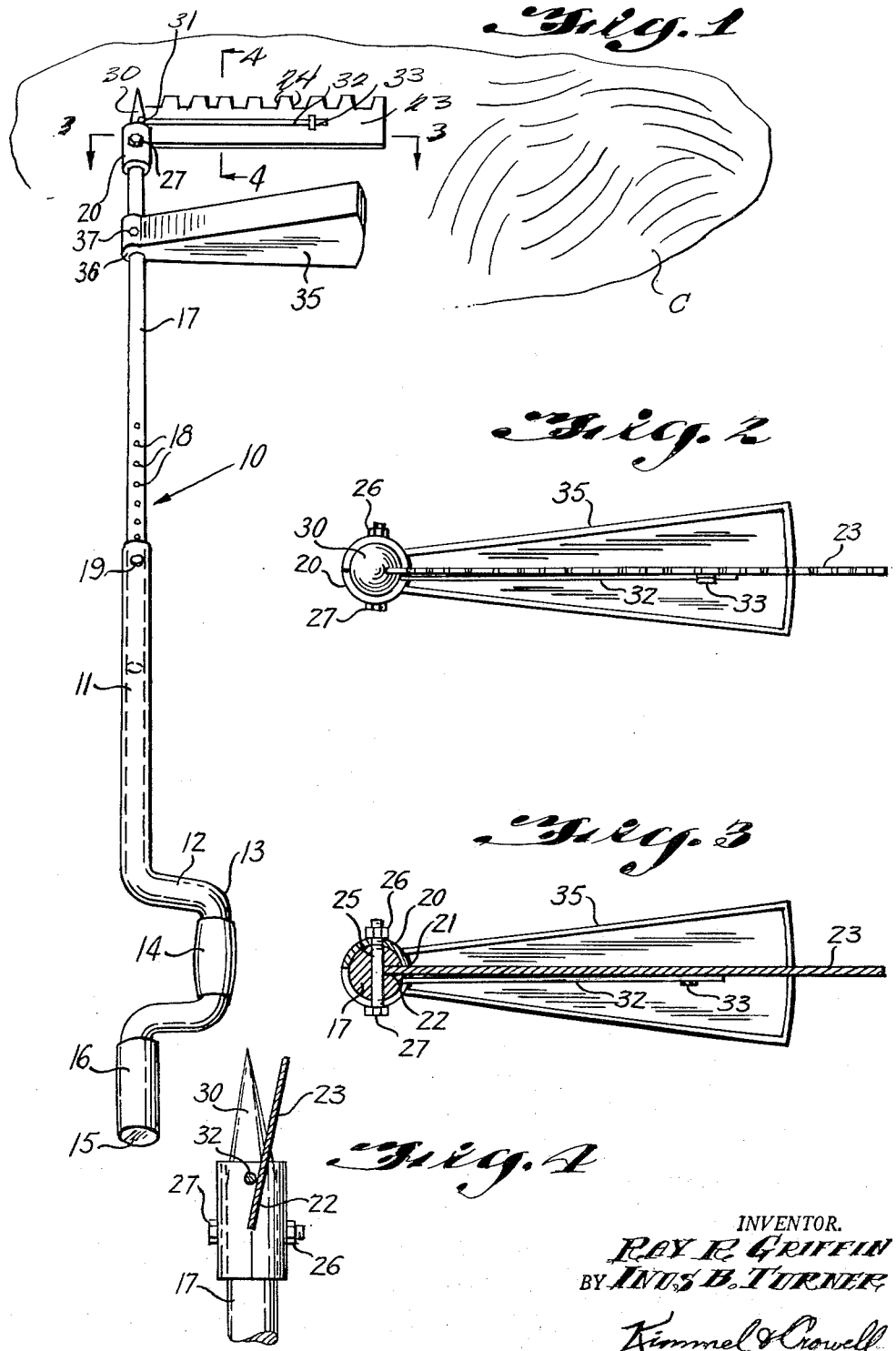

3,025,549
CIRCULAR TROWEL
Inus B. Turner, 2306 Fernwood, Dallas, Tex., and Ray R. Griffin, Box 66, Cathedral City, Calif.
Filed Oct. 27, 1959, Ser. No. 849,061
4 Claims. (Cl. 15—235.6)

This invention relates to a circular trowel, and has as its primary object the provision of an improved trowel particularly adapted for the use of painters in scribing circles on texture ceilings in building construction.

An additional object of the device is the provision of a trowel of this character which is adapted to be operated from a remote point, as by an individual standing on the floor, by a crank arrangement similar to a brace.

A further object of the invention is the provision of means whereby the length of the device may be readily varied to accommodate ceilings of various heights.

Still another object of the invention is the provision of such a device including a rotatable trowel having associated therewith and beneath the same a tray or pan for catching any paint dislodged during the troweling operation.

A further object of the invention is the provision of such a device which is sturdy and durable in construction, reliable and efficient in operation, and relatively simple to manufacture, assemble and utilize.

Still other objects reside in the combinations of elements, arrangements of parts, and details of construction, all as will be more fully pointed out hereinafter and disclosed in the accompanying drawings wherein there is shown a preferred embodiment of this inventive concept.

In the drawing:

FIGURE 1 is a perspective view of one form of the device embodying the elements of the instant invention shown in association with a fragment of a ceiling upon which a circle or circles are to be scribed;

FIGURE 2 is a top plan view of the structure of FIGURE 1;

FIGURE 3 is an enlarged sectional view taken substantially along the line 3—3 of FIGURE 1, as viewed in the direction indicated by the arrows;

FIGURE 4 is an enlarged sectional view taken substantially along the line 4—4 of FIGURE 1, as viewed in the direction indicated by the arrows.

Similar reference characters refer to similar parts throughout the several views of the drawing.

Referring now to the drawings in detail, the device of the instant invention, generally indicated at 10 comprises a tubular shank member 11, which includes an offset U-shaped portion 12 having a bight 13 upon which is mounted a rotatable handle member 14. The offset portion 12 terminates in a straight elongated member 15 in alignment with the shank 11 upon which is rotatably mounted a handle grip member 16, the arrangement being similar to the conventional brace of a brace and bit assembly to permit free rotation of the shank 11 and its associated elements.

Telescopically positioned within the shank 11 is a solid shaft or spindle 17, which may, if desired, be provided with a plurality of bores 18 for the accommodation of a pin 19 which extends through apertures in the upper portion of the shank 11 in order that the effective length of the device may be readily varied. While a pin and aperture adjustment has been herein shown and described, it will be understood that other methods of suitably varying the effective length of the device, such as a simple friction fit may be provided if desired.

The upper end of member 17 is provided with a collar 20, which is slotted as at 21, the slot extending as indicated at 22 (see FIG. 3) into the upper portion of the member 17. The slot is adapted for the reception of a blade 23, which is provided on its upper surface with a plurality of serrations 24, the arrangement of which may be suitably varied for the scribing of various circular arrangments on a ceiling or wall surface. The collar 20 is adapted to be held in position by means of a bolt 25 and nut 26 which extends through a suitable bore 27 extending through the top of the member 17.

The tip of member 17 is conical, as indicated at 30, to provide a contact point about which the trowel is to turn, and is provided with a bore in which is engaged one end 31 of a resilient wire spring 32, the other end of which engages in a bracket 33 carried by the blade for bracing the latter. As best shown in FIGURE 4, the blade 23 is preferably disposed in angular relation, in accordance with the positioning of the slot 22 in which the same is seated, this angularity providing for a more effective control of the device in scribing circles.

A drip pan 35 of generally sector shape includes a collar 36 which is secured as by means of a pin 37 to the upper portion of shaft 17 directly below the blade and aligned therewith, in order to catch any drippings from the blade when the device is rotated.

From the foregoing, the use and operation of the device should now be readily understandable.

A coat of paint or plaster, or other decorative media, is applied to a ceiling C, or other wall surface, and the operator then grasps the handle member 16 in one hand and the handle member 14 in the other hand and by movement of the handle 14 occasions rotation of the blade 23, and simultaneous rotation of the associated drip pan 35. By this operation circles or arcs or other desired decorative effects are produced on the ceiling with a minimum of effort and difficulty.

Obviously, the size and shape of the serrations 24 on the blade 23 may be varied to suit the individual circumstances, and the blade may be readily replaced by disengagement of the same from its associated slot and disengaging the spring 32 from its associated bracket 33.

From the foregoing it will now be seen that there is herein provided an improved circular trowel, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matters herein is to be interpreted merely as illustrative and not in a limiting sense.

We claim:

1. Apparatus of the kind described comprising a spindle, the distal end of said spindle terminating in a conical portion, a collar arranged on said spindle adjacent said conical portion, said collar and the portion of the spindle encompassed thereby being slotted, a serrated scribing blade having one end passing through said slot in said collar and into said slot in said spindle, with said blade extending radially the axis of said spindle, clamp means passing through said collar and spindle and retaining said blade in place, a pie-shaped drip pan having its narrow end fixed to said spindle under and adjacent said collar, the longitudinal axis of said pan substantially underlying said blade and manipulable means for rotating said spindle.

2. Apparatus of the kind described comprising a spindle, the distal end of said spindle terminating in a conical portion, a collar arranged on said spindle adjacent said conical portion, said collar and the portion of the spindle encompassed thereby being slotted, a serrated scribing blade having one end passing through said slot in said collar and into said slot in said spindle, with said blade extending radially the axis of said spindle, clamp means passing through said collar and spindle and retaining said blade in place, the plane of said blade being tilted relative to the axis of said spindle, a pie shaped drip pan having its narrow end fixed to said spindle under and adjacent said collar, the longitudinal axis of said pan substantially underlying said blade and manipulable means for rotating said spindle.

3. Apparatus of the kind described comprising a spindle, the distal end of said spindle terminating in a conical portion, a collar arranged on said spindle adjacent said conical portion, said collar and the portion of the spindle encompassed thereby being slotted, a serrated scribing blade having one end passing through said slot in said collar and into said slot in said spindle, with said blade extending radially from the axis of said spindle, clamp means passing through said collar and spindle and retaining said blade in place, a straight spring wire having one end seated in a bore formed in said conical portion, said wire extending contiguously along the side wall of said blade and engaging a bracket fixed to said blade beyond the medial portion thereof, a pie shaped drip pan having its narrow end fixed to said spindle under and adjacent said collar, the longitudinal axis of said pan substantially underlying said blade and manipulable means for rotating said spindle.

4. Apparatus of the kind described comprising a spindle, the distal end of said spindle terminating in a conical portion, a collar arranged on said spindle adjacent said conical portion, said collar and the portion of the spindle encompassed thereby being slotted, a serrated scribing blade having one end passing through said slot in said collar and into said slot in said spindle, with said blade extending radially the axis of said spindle, clamp means passing through said collar and spindle and retaining said blade in place, a pie shaped drip pan having its narrow end fixed to said spindle under and adjacent said collar, the longitudinal axis of said pan substantially underlying said blade, and manipulable means for rotating said spindle, the base end of said spindle being adjustably telescopically received in said manipulable means.

References Cited in the file of this patent
UNITED STATES PATENTS

| | | |
|---|---|---|
| 1,119,392 | Bernett | Dec. 1, 1914 |
| 1,173,796 | Gottlieb | Feb. 29, 1916 |
| 1,246,925 | Hunt | Nov. 20, 1917 |
| 1,773,048 | Linke | Aug. 12, 1930 |
| 2,629,121 | Petre | Feb. 24, 1953 |
| 2,752,683 | Crane | July 3, 1956 |
| 2,837,754 | Johansen | June 10, 1958 |

FOREIGN PATENTS

| | | |
|---|---|---|
| 1,030,194 | France | Mar. 11, 1953 |